United States Patent
Sakurai

(10) Patent No.: US 12,418,079 B2
(45) Date of Patent: Sep. 16, 2025

(54) ASSEMBLED BATTERY

(71) Applicant: Prime Planet Energy & Solutions, Inc., Tokyo (JP)

(72) Inventor: Takahiro Sakurai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 738 days.

(21) Appl. No.: 17/696,878

(22) Filed: Mar. 17, 2022

(65) Prior Publication Data
US 2022/0302562 A1 Sep. 22, 2022

(30) Foreign Application Priority Data
Mar. 22, 2021 (JP) ................................. 2021-047151

(51) Int. Cl.
*H01M 50/562* (2021.01)
*H01M 50/505* (2021.01)

(52) U.S. Cl.
CPC ....... *H01M 50/562* (2021.01); *H01M 50/505* (2021.01)

(58) Field of Classification Search
CPC ............. H01M 50/562; H01M 50/172; H01M 50/552; H01M 50/507; H01M 50/516
See application file for complete search history.

(56) References Cited

U.S. PATENT DOCUMENTS

| | | |
|---|---|---|
| 2015/0180004 A1 | 6/2015 | Harayama |
| 2015/0380712 A1 | 12/2015 | Tsunaki et al. |
| 2020/0168860 A1 | 5/2020 | Enomoto et al. |
| 2021/0203040 A1 | 7/2021 | Okada et al. |

FOREIGN PATENT DOCUMENTS

| | | |
|---|---|---|
| CN | 104335392 A | 2/2015 |
| JP | 200987722 A | 4/2009 |
| JP | 2014-222620 A | 11/2014 |
| JP | 2015-197974 A | 11/2015 |
| JP | 2018-152224 A | 9/2018 |
| JP | 201975308 A | 5/2019 |
| WO | 2013/046873 A1 | 4/2013 |
| WO | 2014118965 A1 | 8/2014 |
| WO | 2014178130 A1 | 11/2014 |
| WO | 2017130705 A1 | 8/2017 |

*Primary Examiner* — Michael N Orlando
(74) *Attorney, Agent, or Firm* — HAUPTMAN HAM, LLP

(57) ABSTRACT

A technology is provided which suppresses the deterioration of the joint part between the electrode terminal and the bus bar due to an external load. An assembled battery herein disclosed includes a plurality of single cells, and a bus bar. The plurality of single cells each include an electrode body, a battery case, and an electrode terminal. The electrode terminal in at least one single cell among the plurality of single cells includes a first member having one end arranged outside the battery case, and the other end arranged inside the battery case, and a second member arranged at the outer surface of the battery case, and mounted at the end of the first member. Herein, a flexible part protruding toward the bus bar is formed at the surface of the second member, and the electrode terminal is joined with the bus bar at the flexible part.

5 Claims, 5 Drawing Sheets

ASSEMBLED BATTERY

CROSS REFERENCE TO RELATED APPLICATIONS

The present application claims the priority based on Japanese Patent Application No. 2021-047151 filed on Mar. 22, 2021, the entire contents of which are incorporated by reference in the present specification.

BACKGROUND OF THE DISCLOSURE

1. Technical Field

The present invention relates to an assembled battery.

2. Background

Currently, a secondary battery such as a lithium ion secondary battery or a nickel hydrogen battery has been widely used in various fields including a vehicle, a portable terminal, and the like. Such a secondary battery generally includes an electrode body which is a power generating element and a battery case for accommodating the electrode body. Further, for such a secondary battery, such a structure is adopted, which leads out the electrode terminal connected with the electrode body inside the battery case to outside the case. Then, the secondary battery of the foregoing structure can be mounted on a vehicle or the like while configuring an assembled battery. Such an assembled battery is constructed by arraying a plurality of secondary batteries along a prescribed array direction, and connecting respective electrode terminals of the plurality of arrayed secondary batteries by a bus bar. In the following description, the secondary battery forming an assembled battery is also referred to as a "single cell".

Examples of the related art technology regarding the junction between the electrode terminal and the bus bar may include WO 2017/130705. In this publication, in bus bars connecting (joining) a battery cell and a battery cell arranged adjacent to each other, a connection is established between a first connection part and a second connection part connected to one battery cell and another battery cell, respectively via folded parts at 3 sites. Appropriate deformation of the folded parts can absorb the deviation between the battery cells, or the like, which can keep the electrical connection state.

SUMMARY OF THE INVENTION

Incidentally, the assembled battery with the foregoing configuration may be applied with an external load such as an impact or vibration on respective constituent members (e.g., the single cells) according to the usage environment or the manufacturing environment. When such an external load acts on the joint part between the electrode terminal and the bus bar, the joint part may be deteriorated, which may result in the reduction of the junction strength, the electric conductivity, or the like.

The present invention has been made in order to solve such a problem. It is an object of the present invention to provide a technology of suppressing the deterioration of the joint part between the electrode terminal and the bus bar due to an external load.

An assembled battery herein disclosed includes a plurality of single cells arrayed along a prescribed array direction, and a bus bar establishing an electrical connection between the plurality of arrayed single cells. The plurality of single cells each include an electrode body, a battery case for accommodating the electrode body, and an electrode terminal electrically connected to the electrode body, and joined with the bus bar. The electrode terminal in at least one single cell among the plurality of single cells includes: a first member made of a metal having one end arranged outside the battery case, and the other end arranged inside the battery case, and a second member made of a metal arranged at an outer surface of the battery case, and mounted at the one end of the first member. Herein, a flexible part protruding toward the bus bar is formed at a surface of the second member, and the electrode terminal is joined with the bus bar at the flexible part.

For the assembled battery with such a configuration, the bus bar is joined with the flexible part protruding from the surface of the second member toward the bus bar. As a result of this, when the constituent member (such as a single cell) of the assembled battery is applied with an external load, the flexible part is deformed so as to bend. For this reason, it is possible to suppress the application of a stress to the joint part between the second member and the bus bar due to an external load. As a result, it is possible to suppress the deterioration of the joint part between the electrode terminal and the bus bar due to an external load.

In accordance with a preferable aspect of the assembled battery herein disclosed, in a cross sectional view including the joint part forming junction between the flexible part and the bus bar, the flexible part has a flat part extending along a surface of the second member, and a pair of wall parts rising from the surface of the second member toward the flat part. As a result of this, the stress due to an external load can be properly absorbed at the flexible part. For this reason, it is possible to more properly suppress the deterioration of the joint part between the electrode terminal and the bus bar.

In accordance with another preferable aspect of the assembled battery herein disclosed, a thickness of the pair of wall parts is smaller than a thickness in a region except for the flexible part of the second member. With such a configuration, the flexible part becomes more likely to bend with respect to an external load. For this reason, it is possible to better suppress the deterioration of the joint part between the electrode terminal and the bus bar.

Further, in accordance with a still other preferable aspect of the assembled battery herein disclosed, a region surrounded by the flat part and the wall parts is a space. By thus providing the space in the inside of the flexible part, the flexible part becomes more likely to bend with respect to an external load. For this reason, it is possible to better suppress the deterioration of the joint part between the electrode terminal and the bus bar.

Still further, in an aspect in which the space is provided in the inside of the flexible part, it is preferable that a contact interface between the first member and the second member is subjected to metal joining. In the aspect in which the space is provided in the inside of the flexible part, in addition to the effect of suppressing the deterioration of the joint part, the present invention can also contribute to the suppression of the thermal deterioration of the metal joint part between the first member and the second member.

Furthermore, in the aspect in which the first member and the second member are joined with each other, it is preferable that the first member and the second member are composed of mutually different metals. When the first member and the second member include different kinds of metals, the deterioration of the metal joint part between the two members tends to be more likely to be caused than when the members include the same kind of metal. However, by providing the space in the inside of the flexible part as in the foregoing aspect, it is possible to suppress the thermal deterioration of the metal joint part between the first member and the second member.

DETAILED DESCRIPTION OF THE PREFERRED EMBODIMENTS

Figure 1:
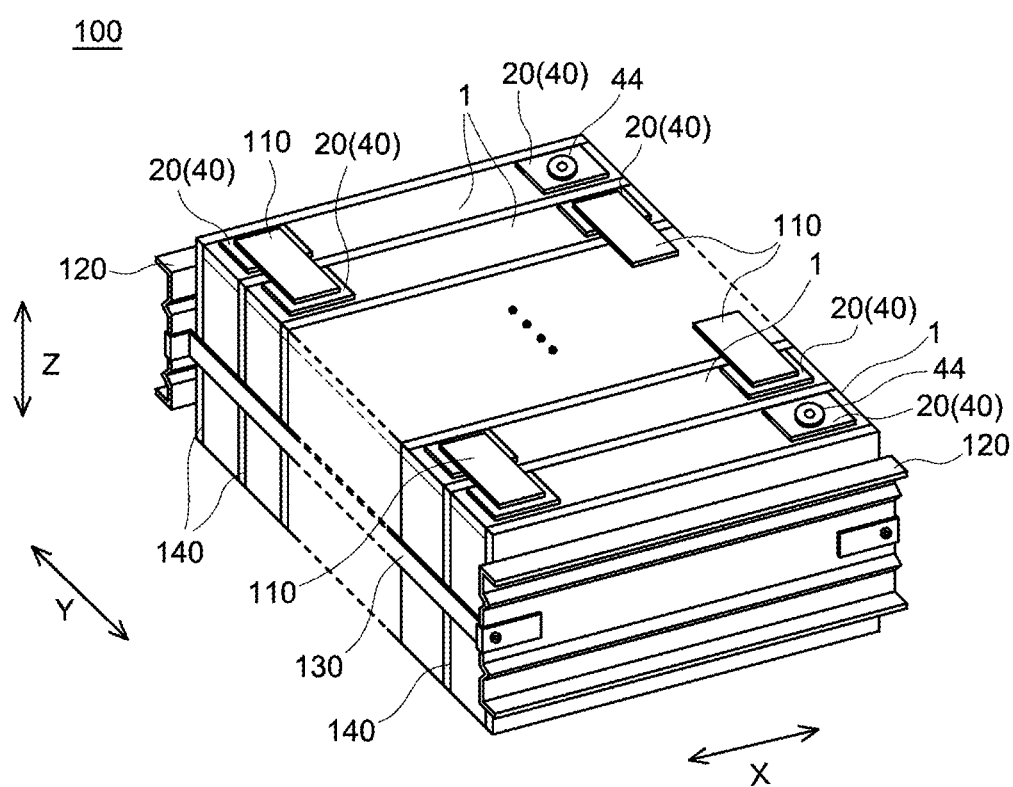
FIG. 1 is a perspective view schematically showing an assembled battery in accordance with First Embodiment.

Below, embodiments of the technology herein disclosed will be described. Incidentally, the following embodiments are not intended to limit the technology herein disclosed. Further, matters necessary for executing the technology herein disclosed, except for matters specifically referred to in the present specification can be grasped as design matters of those skilled in the art based on the related art in the present field. Namely, the technology herein disclosed can be executed based on the contents disclosed in the present specification, and the technical common sense in the present field.

Incidentally, in the drawings referred to in the following description, the members/parts producing the same action are given the same numeral and sign. Further, the dimensional relationships (such as the length, width, and thickness) in each drawing do not reflect the actual dimensional relationships. Then, in each drawing, a reference sign X represents "width direction", a reference sign Y represents "depth direction", and a reference sign Z represents "height direction". However, the directions are defined for convenience of description, and are not intended to limit the setting form of a secondary battery or an assembled battery in use or during manufacturing. Further, in the present specification, the expression of "A to B" indicating the numerical value range includes the meaning of "A or more and B or less", as well as the meaning of "more than A and less than B".

Further, the term "secondary battery" in the present specification denotes an electric storage device in which a charging/discharging reaction is effected by transfer of electric charge carriers between a pair of electrodes (a positive electrode and a negative electrode) via an electrolyte in general. Such a secondary battery also includes a capacitor such as an electric double layer capacitor other than a so-called storage battery such as a lithium ion secondary battery, a nickel hydrogen battery, or a nickel cadmium battery. The technology herein disclosed is not limited to an assembled battery constructed using a specific kind of secondary battery, and is applicable to an assembled battery constructed using a secondary battery having an electrode terminal without particular restriction.

First Embodiment

Figure 2:
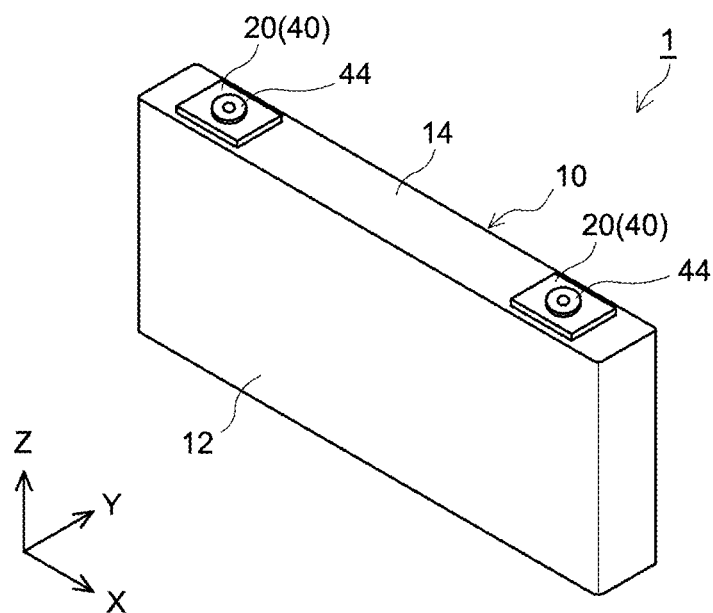
FIG. 2 is a perspective view schematically showing a single cell of the assembled battery in accordance with First Embodiment.
Figure 3:
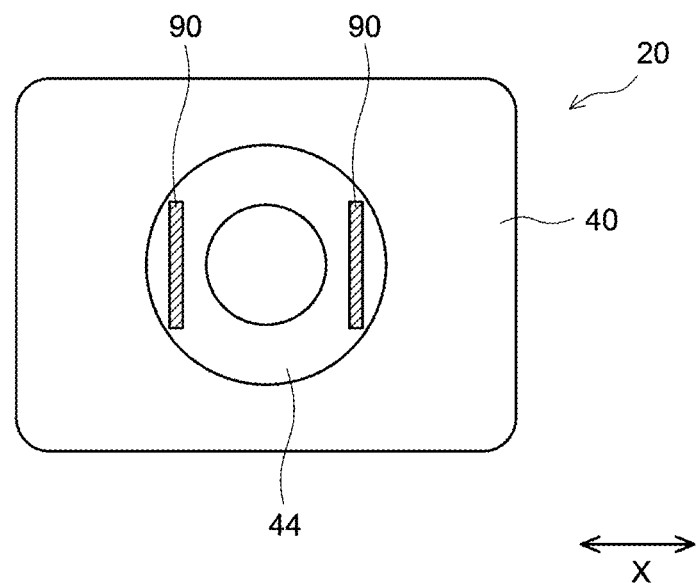
FIG. 3 is a plan view for schematically illustrating a joint part between an electrode terminal and a bus bar in the assembled battery in accordance with First Embodiment.
Figure 4:
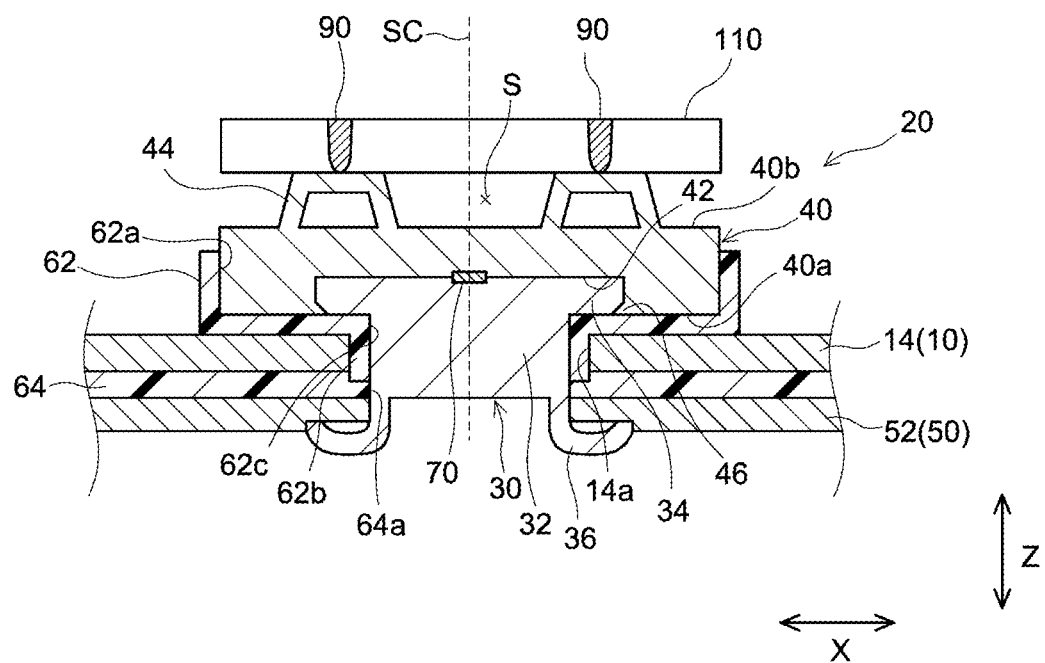
FIG. 4 is a local cross sectional view for schematically showing a joint part between an electrode terminal and a bus bar in the assembled battery in accordance with First Embodiment.
Figure 5:
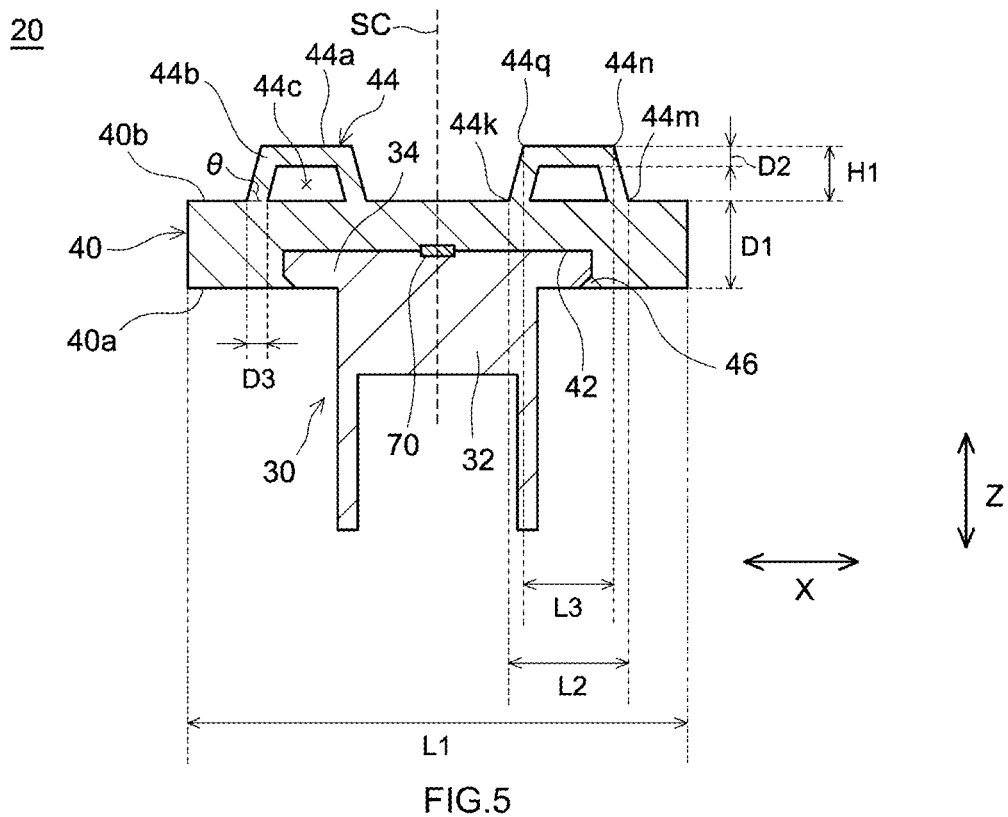
FIG. 5 is a cross sectional view for schematically showing a configuration of an electrode terminal for use in the assembled battery in accordance with First Embodiment.

Below, an assembled battery in accordance with one embodiment (which will be hereinafter referred to as "First Embodiment") of the technology herein disclosed will be described with reference to FIGS. 1 to 5. FIG. 1 is a perspective view schematically showing an assembled battery in accordance with First Embodiment. FIG. 2 is a perspective view schematically showing a single cell of the assembled battery in accordance with First Embodiment. FIG. 3 is a plan view for schematically illustrating a joint part between an electrode terminal and a bus bar in the assembled battery in accordance with First Embodiment. FIG. 4 is a local cross sectional view for schematically illustrating a joint part between an electrode terminal and a bus bar in the assembled battery in accordance with First Embodiment. FIG. 5 is a cross sectional view for schematically illustrating a configuration of the electrode terminal for use in the assembled battery in accordance with First Embodiment.

Assembled Battery

As shown in FIG. 1, an assembled battery 100 in accordance with the present embodiment includes a plurality of single cells 1 arrayed along a prescribed array direction. Specifically, for the assembled battery 100, the plurality of single cells 1 each having a flat square battery case 10 (see FIG. 2) are arrayed along the depth direction Y so that respective flat surfaces are opposed to each other. Then, a pair of end plates 120 are arranged on the opposite outer sides in the array direction (depth direction Y) of such an assembled battery 100. The pair of end plates 120 are crosslinked by a binding beam material 130, thereby binding each of the plurality of single cells 1 along the array direction. Incidentally, in the present embodiment, in order to equalize the binding pressure in the flat surface, a spacer 140 is arranged between the adjacent single cells 1. Then, for the assembled battery 100 in accordance with the present embodiment, an electrical connection between the plurality of arrayed single cells 1 is established by bus bars 110.

Bus Bar

The bus bar 110 is a plate-shaped conductive member as shown in FIG. 1. Although particularly described later, respective single cells 1 are arrayed so that the electrode terminals 20 are adjacent to each other in the depth direction Y, and the bus bar 110 is arranged so as to bridge over the adjacent electrode terminals 20. Then, respective single cells 1 are electrically connected with each other via the bus bars 110, thereby constructing the assembled battery 100. As shown in FIG. 4, the bus bar 110 and the electrode terminal 20 are joined in surface contact with each other. Incidentally, although not particularly restricted, as the constituent material for the bus bar 110, a metal material excellent in conductivity and strength is used. From the viewpoint of suppressing the reduction of the conductivity, for the bus bar 110, the same kind of metal material as that of a second member 40 of the electrode terminal 20 described later is preferably used. As preferable constituent materials for the bus bar 110, mention may be made of aluminum, an alloy mainly including aluminum, and the like. Further, the shape of the bus bar 110 has no particular restriction, and a rod-shaped bus bar may be used in place of a sheet-shaped bus bar.

Single Cell

Then, a description will be given to a configuration of the single cell 1 for use in the assembled battery 100 having the foregoing configuration. Incidentally, the number of the single cells 1 constructing the assembled battery 100 has no particular restriction, and can be appropriately changed according to the object of the assembled battery 100 (the required electric power or the standard of an external device, or the like). Further, with the technology herein disclosed, all of the plurality of single cells constructing the assembled battery are not required to have the following configuration. Namely, it is essential only that the assembled battery herein disclosed includes the single cell with the following configuration as at least one of the single cells constructing the assembled battery. In other words, the assembled battery herein disclosed may include a single cell having a different configuration from that of the single cell configured as described below.

Overall Configuration

As shown in FIG. 2, the single cell 1 includes an electrode body (not shown), a battery case 10, and an electrode terminal 20.

Electrode Body

The electrode body is a power generating element accommodated in the inside of the battery case 10. The structure of the electrode body has no particular restriction, and various structures adoptable in a general secondary battery can be adopted without particular restriction. For example, for the electrode body, the structure in which the positive electrode and the negative electrode are stacked one on another via the separator can be adopted. Specific examples of the structure of this kind of electrode body may include a wound electrode body in which long band-shaped positive electrode, negative electrode, and separator are stacked one on another in a wound manner, and a lamination type electrode body in which rectangular sheet-shaped positive electrode, negative electrode, and separator are stacked one on another. Incidentally, for the particular structures and materials of respective members (the positive electrode, the negative electrode, and the separator) forming the electrode body, those adoptable in a general secondary battery (e.g., a lithium ion secondary battery) can be adopted without particular restriction, and do not limit the technology herein disclosed. For this reason, a detailed description thereon will be omitted.

Electrolyte

Further, although not shown, for the single cell 1, other than the electrode body, the electrolyte is also accommodated in the inside of the battery case 10. As the electrolytes, a nonaqueous type liquid electrolyte (nonaqueous electrolyte) including a nonaqueous solvent and a support salt, a solid electrolyte obtained by forming a powder-shaped electrolyte into a sheet shape, and the like can be used. Incidentally, the specific components of the electrolyte do not limit the technology herein disclosed, and hence will not be described in details.

Battery Case

The battery case 10 is a container for accommodating the electrode body and the electrolyte therein. As shown in FIG. 2, the battery case 10 is a flat square container. Such a square battery case 10 includes a flat square case main body 12 opened at the upper surface thereof, and a sheet-shaped lid body 14 for blocking the upper surface opening of the case main body 12. Further, although described in details later, a terminal insertion hole of the opening for inserting each of a pair of electrode terminals 20 therethrough is provided at each opposite end of the lid body 14 in the width direction X. Incidentally, the outer shape of the battery case 10 is not limited to the foregoing shape, and can be appropriately changed according to the specifications of an external device, the shape of the electrode body, or the like. For example, the battery case 10 may be a bottomed cylindrical case. Further, the material for the battery case 10 has no particular restriction so long as it is a material having a prescribed strength. Preferable examples of the material for the battery case 10 may include a metal material which is lightweight, and has good thermal conductivity (e.g., aluminum, stainless steel, or nickel plating steel).

Electrode Terminal

As shown in FIG. 1, each of the plurality of single cells 1 has a pair of electrode terminals 20 to be joined with the bus bar 110. As shown in FIG. 4, each electrode terminal 20 has a first member 30 and a second member 40. Although not shown, the electrode terminal 20 is electrically connected with the electrode body in the inside of the battery case 10. Of the pair of electrode terminals 20, in the inside of the battery case 10, the electrode terminal electrically connected with the positive electrode is referred to as a positive electrode terminal, and the electrode terminal electrically connected with the negative electrode is referred to as a negative electrode terminal. The structure of the electrode terminal 20 described below may be adopted for any one of or both of the positive electrode terminal and the negative electrode terminal.

First Member

The first member 30 is a member made of a metal which is arranged at one end thereof in the outside of the battery case 10, and is arranged at the other end thereof in the inside of the battery case 10. Specifically, the first member 30 includes a flat sheet-shaped base part 34, and a pillar-shaped shaft part 32. The base part 34 forms one end of the first member 30, is arranged in the outside of the lid body 14 of the battery case 10, and is arranged along the outer surface of the lid body 14. The planar shape of the base part 34 has no particular restriction, and may be a circular shape (which includes a generally circular shape and elliptic shape; the same shall apply hereinafter.), or may be a rectangular shape (which includes a generally rectangular shape: the same shall apply hereinafter). The size of the base part 34 in a plan view may only be a size enough to block an insertion hole 14a of the lid body 14. The shaft part 32 extends from the base part 34 in the vertical direction Z, and penetrates through the lid body 14. The outer shape of the shaft part 32 has no particular restriction, and may be a cylindrical shape, or may be a prismatic shape. Then, the lower end of the shaft part 32 forms the other end of the first member 30, and is arranged in the inside of the battery case 10. At the lower end of the shaft part 32, a rivet part 36 is formed. The rivet part 36 is formed by caulking processing for pressing and deforming the lower end of the shaft part 32 formed in a tubular shape toward the radial outside. The rivet part 36 fixes a third member 50 to the battery case 10 (the lid body 14), and electrically connect the first member 30 and the third member 50.

Although not particularly restricted, the first member 30 can include aluminum, an alloy mainly including aluminum, copper, or an alloy mainly including copper. Incidentally, in the present specification, the term "alloy mainly including aluminum" represents an alloy including aluminum in an amount of at least 70% or more. On the other hand, the term "alloy mainly including copper" represents an alloy including copper in an amount of at least 50% or more. Incidentally, other elements which can be included in the first member 30 have no particular restriction, and mention may be made of silicon, iron, manganese, magnesium, zinc, chromium, titanium, lead, zirconium, or the like.

Second Member

The second member 40 is a member made of a metal arranged on the outer surface of the battery case 10, and mounted at one end of the first member 30. As shown in FIGS. 2, 4, and 5, the second member 40 is a sheet-shaped member arranged along the surface of the lid body 14 in the outside of the battery case 10 (lid body 14). A concave part 42 is formed in a first surface 40*a* (the surface on the battery case 10 side) of the second member 40, and the base part 34 of the first member 30 is fitted into the concave part 42. In the inside of the concave part 42, the first member 30 (base part 34) and the second member 40 are in surface contact with each other. Although not particularly restricted, the contact interface between the first member 30 and the second member 40 is preferably subjected to metal joining. As one example, the contact interface between the first member 30 and the second member 40 situated on a shaft center SC of the shaft part 32 may be desirably joined, thereby forming a metal joint part 70. As a result of this, when the electrode terminal 20 is applied with an external load, the second member 40 can be regulated from moving in the width direction X or the depth direction Y. The means for the joining has no particular restriction, and conventionally known joining means such as ultrasonic welding, laser welding, or resistance welding may be appropriately used. Incidentally, although described in details later, as in the present embodiment, by forming a flexible part 44 having a space 44*c* in the inside thereof, it is also possible to contribute to the suppression of the thermal deterioration of the metal joint part 70. Further, although not particularly restricted, if required, a lock part 46 protruding toward the shaft part 32 of the first member 30 may be provided at the lower end of the sidewall of the concave part 42. This can regulate the movement of the second member 40 in the height direction Z. Incidentally, the planar shape of the second member 40 has no particular restriction, and may be a circular shape, or may be a rectangular shape.

Further, the metal forming the second member 40 may be the same as, or may be different from the metal forming the first member 30. When the first member 30 and the second member 40 include mutually different metals, respectively, the metal joint part 70 is formed by dissimilar metal joining. Such dissimilar metal joining tends to cause deterioration due to heat. For this reason, the effect resulting from the formation of the flexible part 44 having the space 44*c* in the inside thereof is further preferably exhibited. Incidentally, when the first member 30 and the second member 40 include dissimilar metals, mention may be made of the configuration in which the first member 30 includes a copper type material, and the second member 40 includes an aluminum type material.

The flexible part 44 is formed at a second surface 40*b* (the surface opposite to the first surface 40*a*) of the second member 40. The flexible part 44 protrudes toward the bus bar 110 as shown in FIG. 4. Then, the electrode terminal 20 in the present embodiment is joined with the bus bar 110 at the flexible part 44 of the second member 40. Such joining means is typically laser welding. Namely, the joint part 90 between the second member 40 and the bus bar 110 is typically a thermally welded part. The joint part 90 is formed so as to penetrate through the bus bar 110 in the height direction Z, and reach the flexible part 44. For the assembled battery 100 in accordance with the present embodiment, when the constituent member (such as the single cell 1) of the assembled battery 100 is applied with an external load, the flexible part 44 is deformed in a bending manner. For this reason, it is possible to suppress the application of a stress due to an external load on the joint part 90 between the second member 40 and the bus bar 110. As a result of this, it is possible to suppress the deterioration of the joint part 90 between the electrode terminal 20 and the bus bar 110 due to an external load.

Below, a description will be given to one example of the specific structure of the flexible part 44. As shown in FIG. 3, the flexible part 44 is a convex-shaped member formed in a ring shape with the shaft part 32 of the first member 30 (the shaft center SC in FIG. 4) as the center in a plan view. The region surrounded by the bus bar 110, the second surface 40*b* of the second member 40, and the flexible part 44 becomes the space (reference sign S). By forming the flexible part 44 in such a planar ring shape, it is possible to sufficiently ensure the contact area with the bus bar 110, and to improve the junction strength. Further, as shown in FIG. 4, in a cross sectional view including the joint part 90 between the flexible part 44 and the bus bar 110, the flexible part 44 has a flat part 44*a* extending along the surface (second surface 40*b*) of the second member 40, and a pair of wall parts 44*b* rising from the surface (second surface 40*b*) of the second member 40 toward the flat part 44*a*. The flexible part 44 is joined at the flat part 44*a* with the bus bar 110 in a surface contact state. For the flexible part 44 with such a configuration, when a stress due to an external load applies thereto, the pair of wall parts 44*b* are deformed, which can absorb the stress. For this reason, it is possible to more properly suppress the deterioration of the joint part 90 due to application of a strong stress thereto.

Further, for the assembled battery 100 in accordance with the present embodiment, the flexible part 44 for absorbing the external load is formed not at the bus bar 110, but at the second member 40 of the electrode terminal 20. As a result of this, it is possible to suppress the increase in height dimension of the overall assembled battery 100. Further, when concave and convex are formed on the surface of a bus bar, joining (such as laser welding) between the bus bar and an electrode terminal may be hindered. In contrast, in the present embodiment, provision of the flexible part 44 on the side of the electrode terminal 20 can flatten the surface of the bus bar 110. This can facilitate joining between the bus bar 110 and the electrode terminal 20.

Incidentally, for the second member 40 in the present embodiment, a space 44*c* is formed in the region surrounded by the flat part 44*a* and the wall parts 44*b*. More specifically, the space 44*c* is the region surrounded by the flat part 44*a*, the wall parts 44*b*, and the second surface 40*b*. The space 44*c* is thus formed in the inside of the flexible part 44, thereby making the flexible part 44 more likely to bend with respect to an external load. For this reason, it is possible to more preferably prevent the deterioration of the joint part 90. Further, the space 44*c* in the inside of the flexible part 44 can also function as a heat insulating space. For this reason, it is possible to prevent the thermal deterioration due to transmission of a large heat to the metal joint part 70 between the first member 30 and the second member 40 when the bus bar 110 and the electrode terminal 20 are subjected to laser welding. Incidentally, from the viewpoint of ensuring the strength of the flexible part 44 to a certain extent, the space 44c may be filled with a resin material. Such a resin material is preferably a resin material which tends to elastically deform, has excellent flexibility, and is low in rigidity. Examples of the resin material to be filled in the space 44c may include acrylic resin and elastic rubber.

Below, a description will be given to respective dimensions on the flexible part 44 in the present embodiment. First, as shown in FIG. 5, the width L2 of the flexible part 44 is preferably set smaller than the width L1 of the second member 40. From the viewpoint of properly absorbing the stress due to an external load, and preferably preventing the deterioration of the joint part 90, the ratio (L2/L1) of the width L2 of the flexible part 44 to the width L1 of the second member 40 is preferably about 1/10 to 2/5. Further, from the viewpoint of suppressing the deterioration of the flexible part 44 due to an external load, the L2/L1 is more preferably set at, for example, about 1/8 to 1/4. Incidentally, as shown in FIG. 5, the term "width L2 of the flexible part 44" in the present specification represents the dimension between the end 44k and the end 44m of the wall part 44b.

Further, although not particularly restricted, the width L3 of the flat part 44a in the width direction X is preferably the same as the width L2, or smaller than that. From the viewpoint of more preferably preventing the deterioration of the joint part 90 or the flexible part 44, the ratio (L3/L2) of the width L3 of the flat part 44a to the width L2 of the flexible part 44 is preferably about 1/2 to 4/5. Incidentally, the term "width L3 of the flat part 44a" in the present specification represents the dimension between the end 44q and the end 44n of the flat part 44a.

Further, the height H1 of the flexible part 44 is preferably smaller than the thickness D1 of the second member 40. As a result of this, it is possible to suppress the deterioration of the flexible part 44 due to an external load. On the other hand, with an increase in height H1 of the flexible part 44, the stress applied to the joint part 90 between the electrode terminal 20 and the bus bar 110 tends to decrease. From such a viewpoint, the height H1 of the flexible part 44 is desirably set at about 1/5 to 2/3 of the thickness D1 of the second member 40, and preferably set at about, for example, about 1/4 to 1/2. Incidentally, the height H1 of the flexible part 44 is the dimension between the end 44m and the end 44n. Further, the thickness D1 of the second member 40 is the dimension from the first surface 40a to the second surface 40b, and is the thickness except for the height of the flexible part 44.

Further, the inclination angle θ of the wall parts 44b can be appropriately set between 70° to 90°. For example, as the inclination angle θ of the wall parts 44b approaches 90°, the wall parts 44b becomes more likely to absorb the external load in the horizontal direction (the width direction X and the depth direction Y). On the other hand, with a decrease in inclination angle θ of the wall parts 44b, it becomes easier to absorb the external load in the height direction Z at the wall parts 44b. Incidentally, the inclination angle θ of the wall parts 44b in the the present specification represents the more acute angle of the angles formed between the second surface 40b of the second member 40 and the wall parts 44b.

The curvature radius R of the portion of the wall part 44b rising from the second surface 40b of the second member 40 has no particular restriction, and may be 0.05 mm to 1 mm. Incidentally, from the viewpoint of properly absorbing the external load, the curvature radius R of the rising part is preferably, for example, 0.1 mm to 0.8 mm. Incidentally, the "curvature radius R of the rising part" is the radius of a virtual circle in contact with the second surface 40b of the second member 40 and the wall part 44b.

Further, the thickness D3 of the wall part 44b is preferably set comparable to the thickness D1 of the second member 40, or smaller than the thickness D1. As a result of this, the flexible part 44 becomes more likely to bend. For this reason, it is possible to more preferably prevent the deterioration of the joint part 90. As one example, the thickness D3 is desirably set at about 1/5 to 2/3 of the thickness D1, and is preferably set at, for example, about 1/4 to 1/2. On the other hand, the thickness D2 of the flat part 44a has no particular restriction. However, the thickness D2 of the flat part 44a is preferably 0.5 mm or more. As a result of this, when the bus bar 110 and the flexible part 44 are joined, the joint part 90 can be prevented from penetrating through the flat part 44a.

Third Member

Incidentally, the constituent members of the electrode terminal 20 are not limited to the first member 30 and the second member 40. For example, the electrode terminal 20 in the present embodiment includes the third member 50 as shown in FIG. 4. Although not shown, the third member 50 has a collector part extending along the height direction Z. The collector part of the third member 50 is connected at the lower end thereof with the electrode body (the positive electrode or the negative electrode). Then, as shown in FIG. 4, the upper end 52 of the third member 50 is bent so as to be along the inner surface of the battery case 10 (lid body 14). Then, the upper end 52 of the third member 50 is fixed to the battery case 10 (lid body 14) by the rivet part 36 of the first member 30, and is electrically connected with the first member 30. As a result of this, the electrode body in the battery case 10 and the second member 40 outside the battery case 10 are electrically connected with each other via the third member 50 and the first member 30. Incidentally, the third member 50 is not an essential constituent member of the electrode terminal 20. For example, when a part of the first member 30 is extended along the height direction, and is connected with the electrode body, an electrode terminal 20 not having the third member 50 can be constructed.

Insulating Material

Incidentally, the single cell of the assembled battery herein disclosed may include an insulating material for preventing the conduction between the electrode terminal 20 and the battery case 10. As one example, the single cell 1 includes a gasket 62 and insulator 64 as insulating materials.

Gasket

The gasket 62 is an insulating material arranged on the outer surface of the battery case 10 (the upper surface of the lid body 14). Such a gasket 62 is a box-shaped insulating material having an accommodating part 62a on the upper surface side thereof. The electrode terminal 20 (the base part 34 of the first member 30 and the second member 40) is accommodated in the accommodating part 62a of the gasket 62. As a result of this, an insulation is established between the lid body 14 and the first member 30, and between the lid body 14 and the second member 40. Further, a tubular-shaped convex part 62b having a terminal insertion hole 62c is formed at the gasket 62 in the present embodiment. The convex part 62b of the gasket 62 is inserted into the terminal insertion hole 14a of the lid body 14. Then, the convex part 62b of the gasket 62 is interposed between the shaft part 32 of the first member 30 in the inside of the terminal insertion hole 14a and the lid body 14, which can insulate the members. Further, the gasket 62 is pressurized at the caulking processing for forming the rivet part 36 of the first member 30, and hence is compressed between the lid body 14 and the second member 40 (or between the lid body 14 and the base part 34 of the first member 30). As a result of this, the gap upon mounting each member on the lid body 14 is sealed, which can prevent circulation of liquid (penetration of moisture, and leakage of the electrolyte) inside and outside the battery case 10. Incidentally, the gasket 62 is preferably formed of an insulating resin which tends to be elastically deformed. Examples of the material for such a gasket 62 may include a fluorinated resin such as perfluoroalkoxy fluorine resin (PFA), a polyphenylene sulfide resin (PPS), and aliphatic polyamide.

Insulator

The insulator 64 is a sheet-shaped insulating material having an opening 64*a*, and is arranged between the battery case 10 (lid body 14) and the third member 50. As a result of this, the lid body 14 and the third member 50 are insulated from each other. Then, the opening 64*a* of the insulator 64 is arranged so as to overlap the terminal insertion hole 62*c* of the gasket 62 in a plan view, so that the shaft part 32 of the first member 30 is inserted therethrough. As a result of this, it is possible to prevent the contact between the shaft part 32 of the first member 30 and the lid body 14 with reliability. Further, at the caulking processing for forming the rivet part 36 at the lower end of the first member 30, the lower surface of the convex part 62*b* of the gasket 62 is pressed against the circumferential part of the opening 64*a* of the insulator 64. As a result of this, the gasket 62 and the insulator 64 are crimped. For this reason, it is possible to prevent the circulation of the liquid inside and outside the battery case 10 with more reliability. Incidentally, the insulator 64 is preferably formed of an insulating resin which tends to be elastically deformed as with the gasket 62.

OTHER EMBODIMENTS

Up to this point, one embodiment of the technology herein disclosed has been described. Incidentally, the First Embodiment shows one example of the assembled battery to which the technology herein disclosed is applied, and is not intended to limit the technology herein disclosed. Below, other embodiments of the technology herein disclosed will be described. Incidentally, in the following description, generally the same configuration as that of the assembled battery 100 in accordance with the First Embodiment can be adopted except for the points specifically referred to.

Second Embodiment

Figure 6:
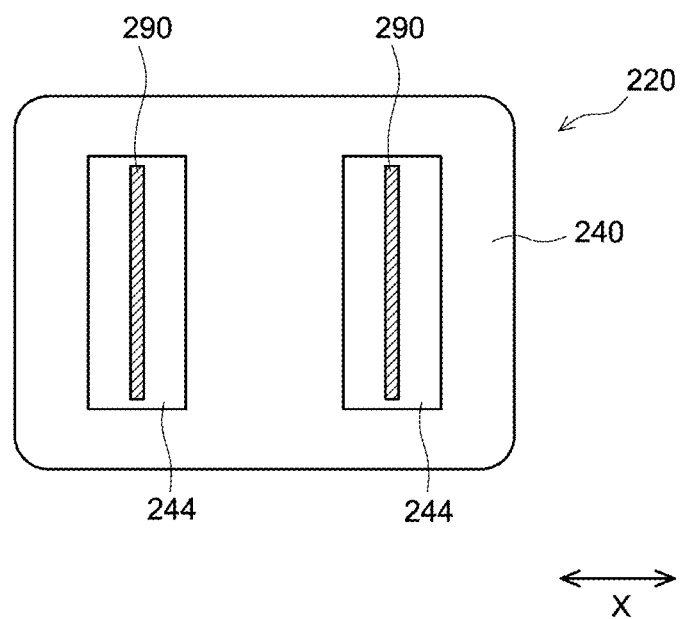
FIG. 6 is a plan view for schematically showing a joint part between an electrode terminal and a bus bar in an assembled battery in accordance with Second Embodiment.

For example, as shown in FIG. 3, in First Embodiment, the flexible part 44 in a planar ring shape was formed at the second member 40. However, the planar shape of the flexible part is not limited thereto. FIG. 6 is a plan view for schematically illustrating the joint part between the electrode terminal and the bus bar in an assembled battery in accordance with Second Embodiment. As shown in FIG. 6, a second member 240 of the electrode terminal 220 in Second Embodiment has a flexible part 244 in a linear shape in a plan view. Specifically, the second member 240 is provided with a pair of linear flexible parts 244 opposed to each other with the shaft part 32 of the first member 30 (see FIG. 4) interposed therebetween. Even in such a planar shape, the flexible part 244 can be properly deformed with respect to an external load. For this reason, it is possible to suppress the application of a strong stress to the joint part 290 between the bus bar and the electrode terminal 220.

Third Embodiment

Figure 7:
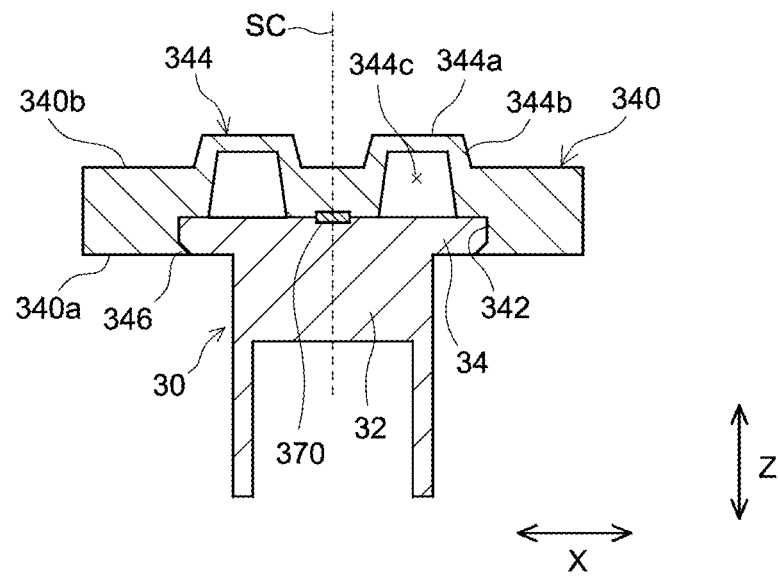
FIG. 7 is a cross sectional view for schematically showing a configuration of an electrode terminal for use in an assembled battery in accordance with Third Embodiment.

Further, the flexible part may only protrude toward the bus bar, and is also not required to have the cross sectional structure as described in the First Embodiment. Specifically, in First Embodiment, there is provided the flexible part 44 including the space 44*c* surrounded by the flat part 44*a*, the wall parts 44*b*, and the second surface 40*b* formed in the inside thereof. The electrode terminal 20 with such a configuration is formed by, for example, welding the flexible part 44 to the second surface 40*b* of the sheet-shaped second member 40. However, the cross sectional structure of the flexible part is not limited thereto. FIG. 7 is a cross sectional view for schematically illustrating the electrode terminal for use in an assembled battery in accordance with Third Embodiment. As shown in the FIG. 7, for an electrode terminal 320 in Third Embodiment, a flexible part 344 is formed by bending a sheet-shaped second member 340. The flexible part 344 in Third Embodiment has a flat part 344*a* extending along the second surface 340*b* of the second member 340, and a pair of wall parts 344*b* rising from the second surface 340*b*, and the contact interface between the concave part 342 and the first member 30 toward the flat part 344*a*. Further, when the flexible part 344 with such a configuration is provided, a space 344*c* surrounded by the flat part 344*a*, the wall parts 344*b*, and the first member 30 is formed. Even when the flexible part 244 with such a cross sectional structure is provided, it is possible to suppress the application of a strong stress to the joint part between the bus bar and the electrode terminal. Further, for the electrode terminal 320 in Third Embodiment, the space 344*c* is formed around the metal joint part 370 between the first member 30 and the second member 340. For this reason, it is possible to further preferably suppress the thermal deterioration of the metal joint part 370. Incidentally, a reference sign 340*a* represents the first surface of the second member, and 346 represents the lock part.

Fourth Embodiment

Figure 8:
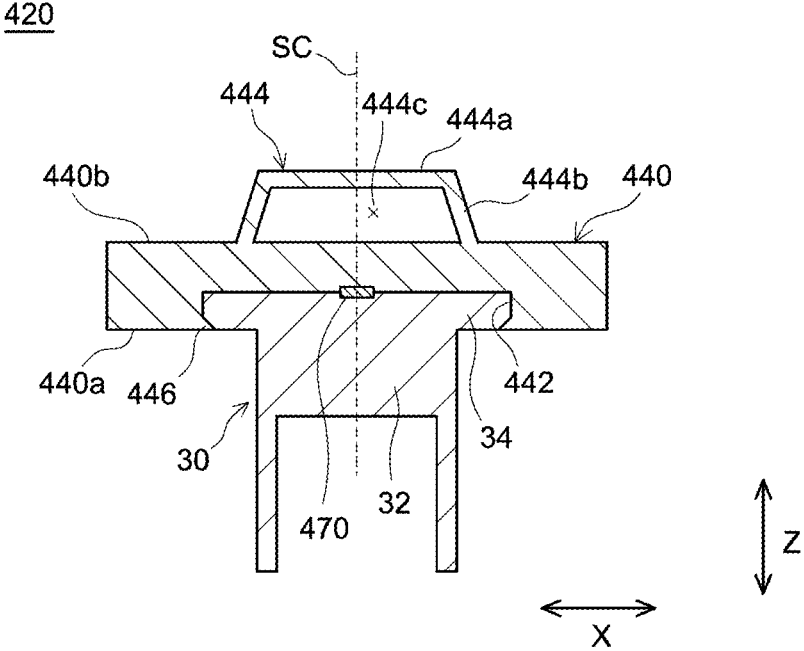
FIG. 8 is a cross sectional view for schematically showing a configuration of an electrode terminal for use in an assembled battery in accordance with Fourth Embodiment.

Further, in the First to Third Embodiments, in any case, in a cross sectional view, a pair of flexible parts 44 are formed so as to interpose the shaft part 32 of the first member 30 therebetween. However, the number of the flexible parts to be formed in a cross sectional view has no particular restriction. FIG. 8 is a cross sectional view for schematically illustrating the configuration of the electrode terminal for use in an assembled battery in accordance with Fourth Embodiment. The second member 440 of the electrode terminal 420 in Fourth Embodiment is provided with one flexible part 444 in a cross sectional view. Even when the flexible part 444 with such a configuration is formed, it is possible to suppress the application of a strong stress to the joint part between the bus bar and the electrode terminal. Incidentally, when the number of the flexible parts 444 to be formed in a cross sectional view is set at 1 as in the present embodiment, the width of the flexible part 444 in the width direction X can be elongated. For this reason, it is possible to form the flexible part 444 which is more likely to bend with respect to an external load. Further, a reference sign 440*a* represents the first surface of the second member; 440*b*, the second surface of the second member; 442, the concave part; 444*a*, the flat part of the the flexible part; 444; 444*b*, the wall part of the flexible part 444; 444*c*, the space; 446, the lock part; and 470, the metal joint part between the first member 30 and the second member 40.

OTHER EMBODIMENTS

Further, in the First to Fourth Embodiments, in any case, the flexible part having a flat part and a pair of wall parts is formed. However, the flexible part has no particular restriction on the structure so long as it can be deformed so as to bend with respect to an external load, which can suppress the stress on the joint part between the bus bar and the electrode terminal. For example, the flexible part may include an elastic member (e.g., elastic rubber or spring) mounted on the surface of the second member, and a flat part mounted at the upper end of the elastic member. When the flexible part with such a configuration is provided, bending of the elastic member with respect to an external load can suppress the application of a large stress on the joint part between the flat part and the bus bar.

Further, the structure of other members than the flexible part can be appropriately changed. For example, in the embodiments, in any case, the flat sheet-shaped bus bar 110 is used. However, concave and convex may be provided on the bus bar unless the junction between the bus bar and the electrode terminal is hindered. For example, such a concave part as to be equivalent to the shape of the flexible part may be formed on the surface on the electrode terminal side of the bus bar (typically, the surface in contact with the flexible part). As a result of this, it is possible to more firmly join the flexible part and the bus bar.

Up to this point, specific examples of the technology herein disclosed have been described in details. However, these are merely illustrative, and should not be construed as limiting the scope of the appended claims. The invention herein disclosed includes various modifications and changes of the specific examples.

What is claimed is:

1. An assembled battery, comprising:
    a plurality of single cells arrayed along an array direction, and
    a bus bar establishing an electrical connection between the plurality of single cells,
        the plurality of single cells each comprising
            an electrode body,
            a battery case in a flat square shape and accommodating the electrode body, the battery base having a flat surface, and
            an electrode terminal electrically connected to the electrode body and joined with the bus bar,
        the plurality of single cells arrayed in the array direction and respective flat surfaces of the plurality of single cells are opposed to each other in the array direction,
        the bus bar bridging over adjacent electrode terminals of the plurality of single cells in the array direction, the electrode terminal in at least one single cell among the plurality of single cells comprising:
            a first member made of metal and having one end arranged on an outer side of the battery case, and another end arranged on an inner side of the battery case, and
            a second member which is sheet shaped and made of a metal arranged at an outer surface of the battery case, and mounted at the one end of the first member,
    wherein
        the second member has a first surface on a side of the battery case, and a second surface opposite to the first surface,
        the second member comprises a flexible part on the second surface, the flexible part protruding from the second surface toward the bus bar,
        the electrode terminal is joined with the bus bar at the flexible part,
        a height of the flexible part is smaller than a thickness of a portion of the second member from the first surface to the second surface,
        in a cross sectional view including a joint part forming a junction between the flexible part and the bus bar, the flexible part comprises
            a flat part extending in a direction along the second surface of the second member, and
            a pair of wall parts protruding from the second surface of the second member toward the flat part,
        a region surrounded by the flat part and the pair of wall parts is a space, and
        the flexible part is a convex-shaped part in a ring shape in a plan view.

2. The assembled battery according to claim 1, wherein a thickness of the pair of wall parts is smaller than the thickness of the portion of the second member from the first surface to the second surface.

3. The assembled battery according to claim 1, wherein a contact interface between the first member and the second member is subjected to metal joining.

4. The assembled battery according to claim 3, wherein the first member and the second member are composed of mutually different metals.

5. The assembled battery according to claim 1, wherein the space is surrounded by the flat part, the pair of wall parts and the second surface of the second member.

* * * * *